US011256948B2

(12) United States Patent
Shah

(10) Patent No.: US 11,256,948 B2
(45) Date of Patent: Feb. 22, 2022

(54) DIGITAL-IMAGE SHAPE RECOGNITION USING TANGENTS AND CHANGE IN TANGENTS

(71) Applicant: Kevat Shah, San Jose, CA (US)

(72) Inventor: Kevat Shah, San Jose, CA (US)

( * ) Notice: Subject to any disclaimer, the term of this patent is extended or adjusted under 35 U.S.C. 154(b) by 0 days.

(21) Appl. No.: 15/956,652

(22) Filed: Apr. 18, 2018

(65) Prior Publication Data

US 2019/0122068 A1   Apr. 25, 2019

Related U.S. Application Data

(60) Provisional application No. 62/486,594, filed on Apr. 18, 2017.

(51) Int. Cl.
*G06K 9/00* (2006.01)
*G06K 9/46* (2006.01)
*G06K 9/62* (2022.01)
*G06K 9/52* (2006.01)

(52) U.S. Cl.
CPC ....... *G06K 9/4638* (2013.01); *G06K 9/00422* (2013.01); *G06K 9/52* (2013.01); *G06K 9/6201* (2013.01); *G06K 2209/01* (2013.01)

(58) Field of Classification Search
CPC ...................................................... G06T 5/00
See application file for complete search history.

(56) References Cited

U.S. PATENT DOCUMENTS

| | | | |
|---|---|---|---|
| 6,597,360 B1 * | 7/2003 | Stamm | G06T 11/203 345/467 |
| 8,244,038 B2 * | 8/2012 | Fan | G06K 9/481 382/182 |
| 2005/0238244 A1 * | 10/2005 | Uzawa | G06T 9/20 382/242 |
| 2008/0253659 A1 * | 10/2008 | Walch | G06K 9/00161 382/186 |

* cited by examiner

Primary Examiner — Hadi Akhavannik

(57) ABSTRACT

In one aspect, a method of optical character recognition of digital character objects in digital images includes the step of obtaining a digital image. The digital images include rendering of a first object in the digital image. The first object comprises a set of sub-objects and a set of relationships between the sub-object. The method includes the step of generating a definition of a first object by defining an object outline for the first object as a set of sub-objects; defining a sub-object outline for each sub-object as a set of lines and curves; and defining each relationship between each set of connected sub-objects in terms of one or more intersections or one or more corners.

18 Claims, 19 Drawing Sheets

| Point | Degrees | Radians |
|---|---|---|
| A | 0 | 0 |
| B | 45 | 0.79 |
| C | 90 | 1.57 |
| D | 135 | 2.36 |

| Point | Tangent | Change in Tangent |
|---|---|---|
| A | -45° | N/A |
| B | 0° | 45° |
| C | 45° | 45° |
| D | 45° | 0° |
| E | 40° | -5° |
| F | 0° | -40° |
| G | -45° | -45° |

800

Square

Parallelogram

1000

| Sub-object | Type | Direction of change in tangent | Is Connected | Number of angles covered | Absolute length | Relative length |
|---|---|---|---|---|---|---|
| 1 | Line | 0 | N/A | N/A | 1 | 1/4 |
| 2 | Line | 0 | N/A | N/A | 1 | 1/4 |
| 3 | Line | 0 | N/A | N/A | 1 | 1/4 |
| 4 | Line | 0 | N/A | N/A | 1 | 1/4 |

1400

| Corner | Sub-object 1 | Sub-object 2 | Angle |
|--------|--------------|--------------|-------|
| A | 1 | 2 | 90° |
| B | 2 | 3 | 90° |
| C | 3 | 4 | 90° |
| D | 4 | 1 | 90° |

1500

| Sub-object | Type | Direction of change in tangent | Is Connected | Number of angles covered | Absolute length | Relative length |
|---|---|---|---|---|---|---|
| 1 | Line | Negative | N/A | N/A | 1 | 1 / 2.57 |
| 2 | Curve | 0 | No | 180° | 1.57 | 1.57 / 2.57 |

1600

DIGITAL-IMAGE SHAPE RECOGNITION USING TANGENTS AND CHANGE IN TANGENTS

This application claims priority from U.S. Provisional Application No. 62/486,594, titled SHAPE RECOGNITION USING TANGENTS AND CHANGE IN TANGENTS and filed 18 Apr. 2016. This application is hereby incorporated by reference in its entirety for all purposes.

BACKGROUND

1. Field

This application relates generally to optical character recognition, and more specifically to a system, article of manufacture and method for digital-image shape recognition using tangents and change in tangents.

2. Related Art

A majority of the character recognition applications used today rely on OCR engines (e.g. TESSERACT) that may work well with recognition of typed characters but may not be very accurate with recognition of hand written characters or recognition of generic objects such as cars or bottles. Additionally, many aspects of the current recognition engines are often specific for each language and cannot be applied to characters for all languages. Accordingly, improvements to character/shape recognition engines are desired for recognizing characters of all languages as well as recognizing various objects.

BRIEF SUMMARY OF THE INVENTION

In one aspect, a method of optical character recognition of digital character objects in digital images includes the step of obtaining a digital image. The digital images include rendering of a first object in the digital image. The first object comprises a set of sub-objects and a set of relationships between the sub-object. The method includes the step of generating a definition of a first object by defining an object outline for the first object as a set of sub-objects; defining a sub-object outline for each sub-object as a set of lines and curves; and defining each relationship between each set of connected sub-objects in terms of one or more intersections or one or more corners.

Figure 1:
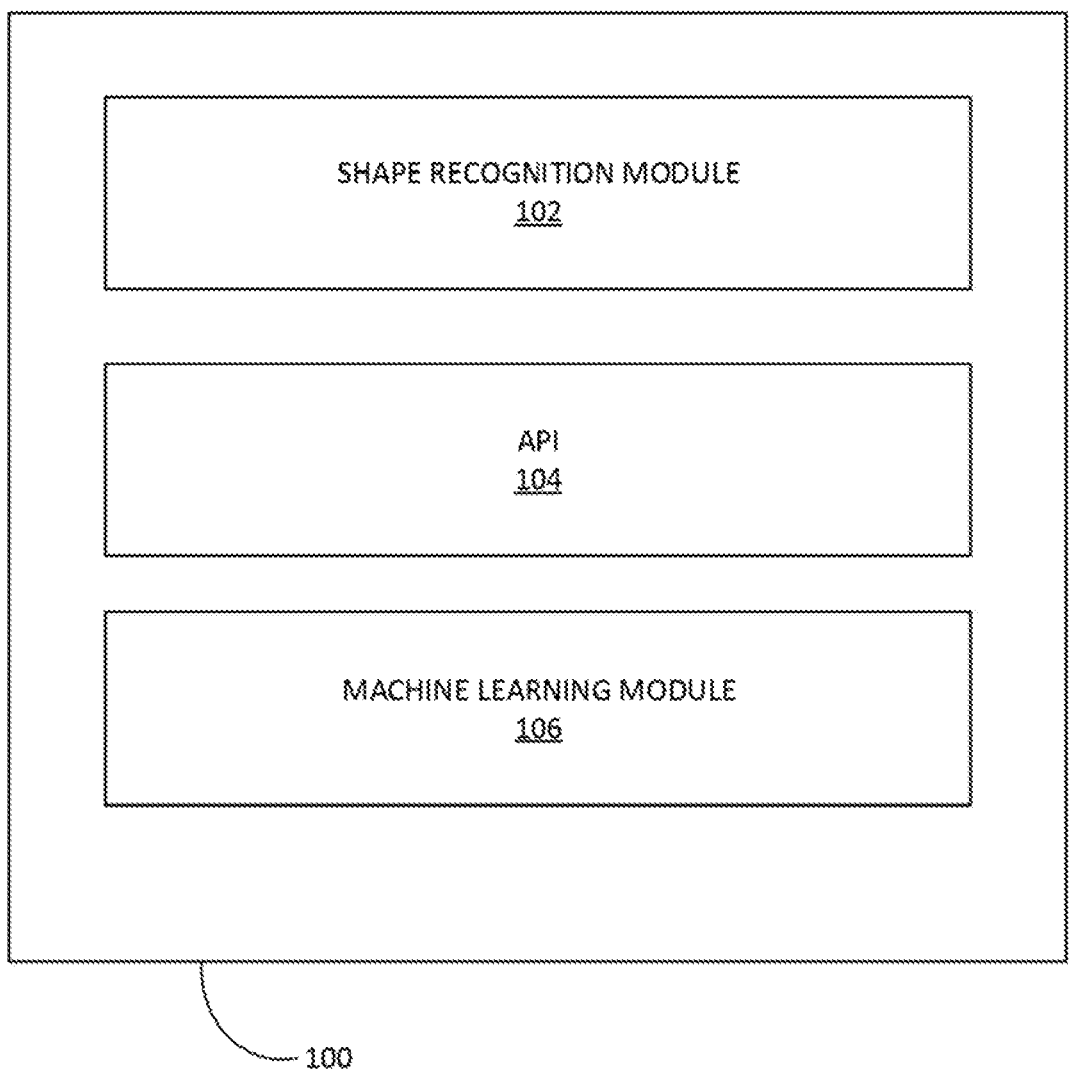
FIG. 1 illustrates an example system for shape recognition, according to some embodiments.

The Figures described above are a representative set and are not an exhaustive with respect to embodying the invention.

DESCRIPTION

Disclosed are a system, method, and article of manufacture for methods and systems of Digital-Image Shape Recognition using Tangents and Change in Tangents. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can specify how software components of various systems interact with each other.

Cloud computing can involve deploying groups of remote servers and/or software networks that allow centralized data storage and online access to computer services or resources. These groups of remote serves and/or software networks can be a collection of remote computing services.

Corner represents two sub-objects adjacent to each other, as well as, the angle between the two objects.

Inflection point a point where the change in tangent switches from a positive value to a negative value or vice-versa.

Intelligent character recognition (ICR) is an advanced optical character recognition (OCR) that can be used as a handwriting recognition system that allows fonts and different styles of handwriting to be learned by a computer during processing to improve accuracy and recognition levels.

Intersection can be a series of corners of a geometric object that exist at the same point.

Object recognition can be one or several pre-specified or learned objects or object classes can be recognized, usually together with their 2D position in the image or 3D poses in the scene.

Optical character recognition can be the mechanical or electronic conversion of images of typed, handwritten or printed text into machine-encoded text, whether from a scanned document, a photo of a document, a scene-photo (for example the text on signs and billboards in a landscape photo) or from subtitle text superimposed on an image (for example from a television broadcast).

Topological skeleton of a shape is a thin version of that shape that is equidistant to its boundaries. The skeleton usually emphasizes geometrical and topological properties of the shape, such as its connectivity, topology, length, direction, and width. Together with the distance of its points to the shape boundary, the skeleton can also serve as a representation of the shape (they contain all the information necessary to reconstruct the shape).

Example Computer Architecture and Systems

FIG. 1 illustrates an example system 100 for shape recognition, according to some embodiments. System 100 can include a shape recognition module 102. Shape recognition module 102 can use the methods and systems of FIGS. 2-18. The output of shape recognition module 102 can be utilized by computer-vision/OCR module 106 to implement various computer vision, OCR, object recognition, object detection, etc. API 104 can be used by other programs/systems to interact with system 100 and/or its modules. System 100 can utilize machine learning techniques (e.g. artificial neural networks, etc.) to implement module shape recognition module 102 and computer-vision/OCR module 106, etc. Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning. In one example, a system 100 can utilize the instantaneous slope of the outline (e.g. the tangent value) as well as, the rate of change of that slope (e.g. a change in tangent value).

Figure 2:
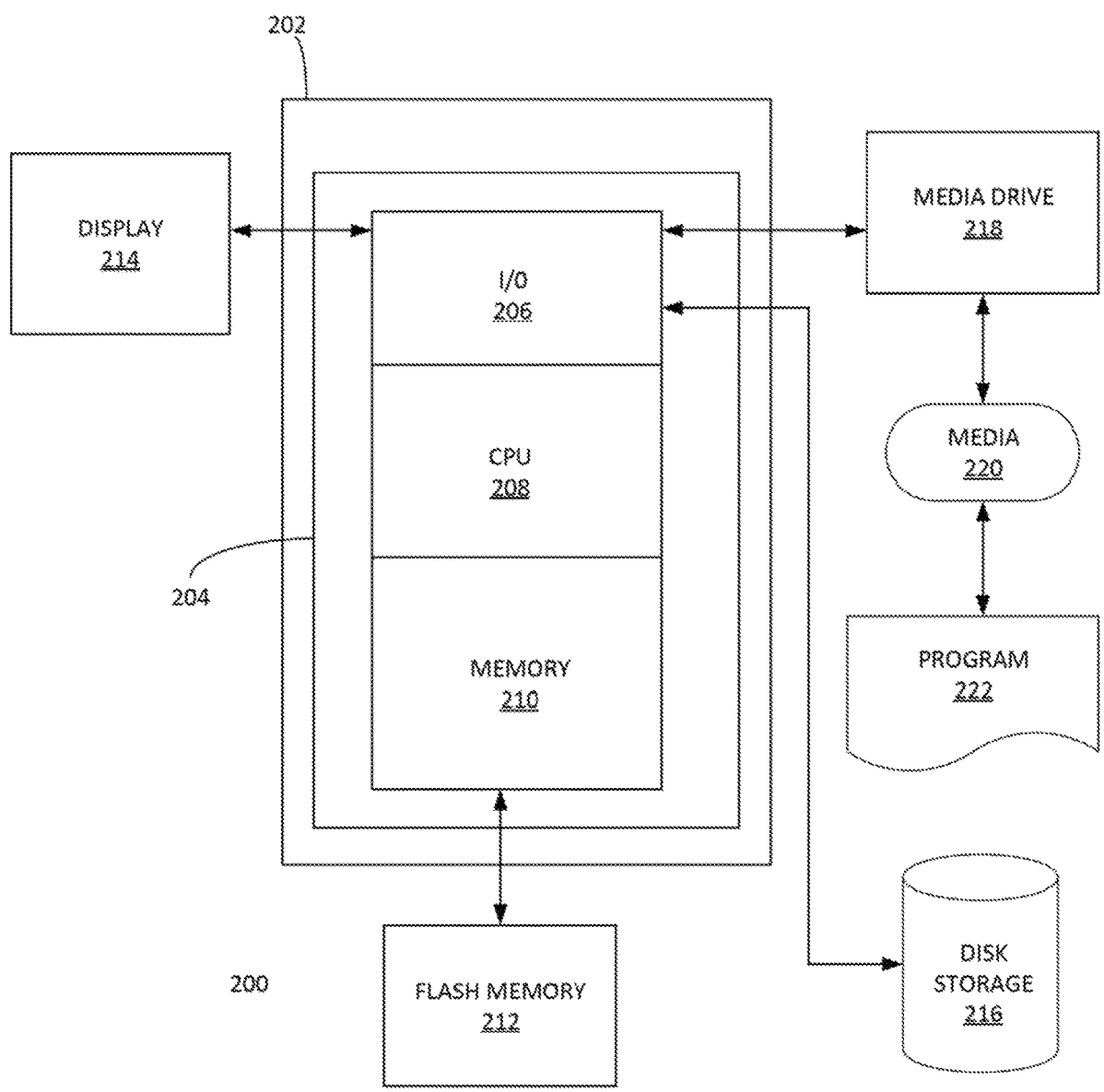
FIG. 2 depicts an exemplary computing system that can be configured to perform any one of the processes provided herein.

FIG. 2 depicts an exemplary computing system 200 that can be configured to perform any one of the processes provided herein. In this context, computing system 200 may include, for example, a processor, memory, storage, and I/O devices (e.g., monitor, keyboard, disk drive, Internet connection, etc.) However, computing system 200 may include circuitry or other specialized hardware for carrying out some or all aspects of the processes. In some operational settings, computing system 200 may be configured as a system that includes one or more units, each of which is configured to carry out some aspects of the processes either in software, hardware, or some combination thereof.

FIG. 2 depicts computing system 200 with a number of components that may be used to perform any of the processes described herein. The main system 202 includes a motherboard 204 having an I/O section 206, one or more central processing units (CPU) 208, and a memory section 210, which may have a flash memory card 212 related to it. The I/O section 206 can be connected to a display 214, a keyboard and/or other user input (not shown), a disk storage unit 216, and a media drive unit 218. The media drive unit 218 can read/write a computer-readable medium 220, which can contain programs 222 and/or data. Computing system 200 can include a web browser. Moreover, it is noted that computing system 200 can be configured to include additional systems in order to fulfill various functionalities. Computing system 200 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 3:
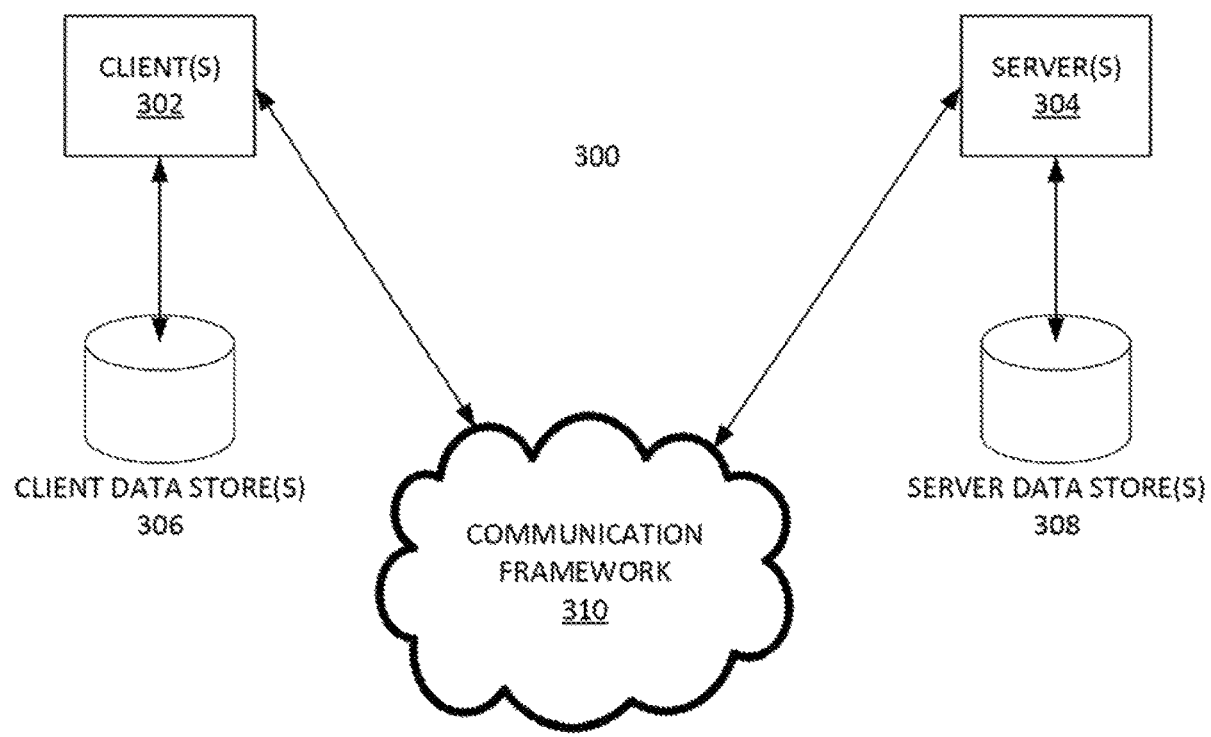
FIG. 3 is a block diagram of a sample computing environment that can be utilized to implement various embodiments.

FIG. 3 is a block diagram of a sample computing environment 300 that can be utilized to implement various embodiments. The system 300 further illustrates a system that includes one or more client(s) 302. The client(s) 302 can be hardware and/or software (e.g., threads, processes, computing devices). The system 300 also includes one or more server(s) 304. The server(s) 304 can also be hardware and/or software (e.g., threads, processes, computing devices). One possible communication between a client 302 and a server 304 may be in the form of a data packet adapted to be transmitted between two or more computer processes. The system 300 includes a communication framework 310 that can be employed to facilitate communications between the client(s) 302 and the server(s) 304. The client(s) 302 are connected to one or more client data store(s) 306 that can be employed to store information local to the client(s) 302. Similarly, the server(s) 304 are connected to one or more server data store(s) 308 that can be employed to store information local to the server(s) 304. In some embodiments, system 300 can instead be a collection of remote computing services constituting a cloud-computing platform.

Exemplary Methods

Figure 4:
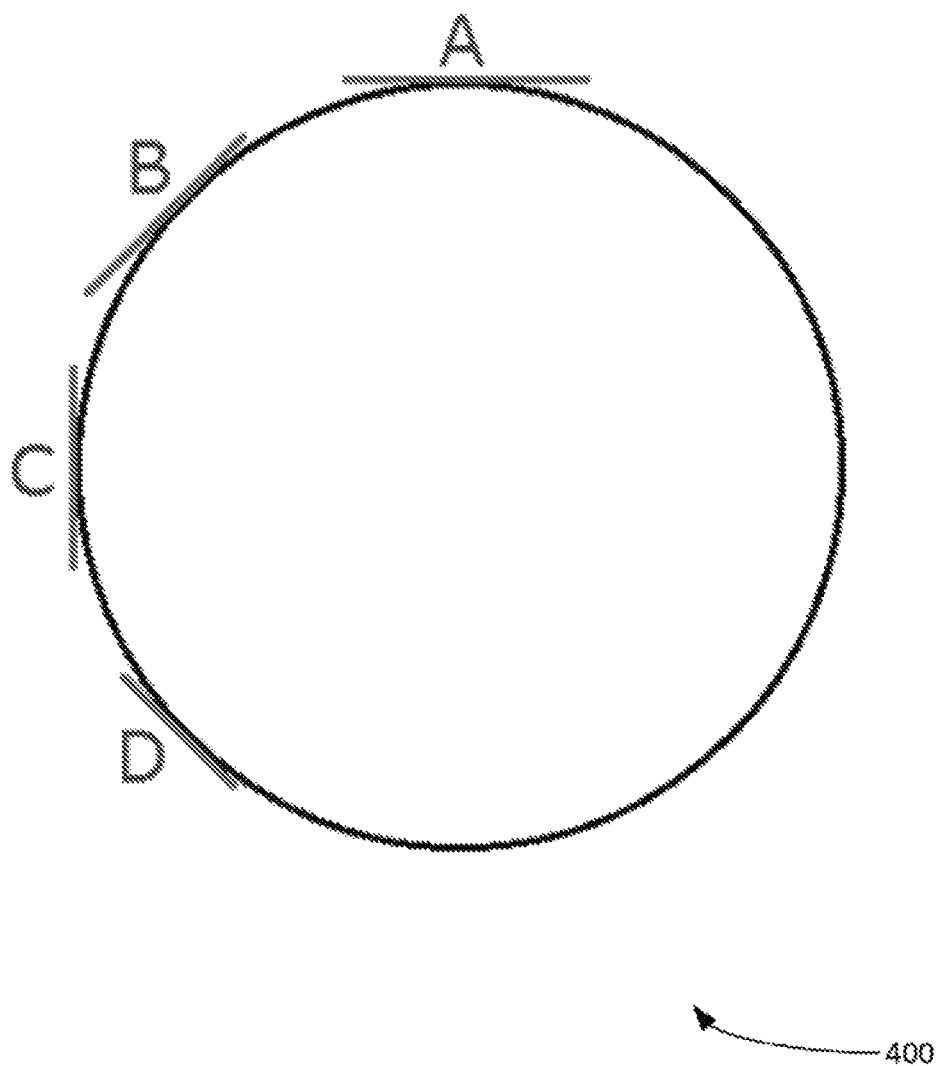
FIG. 4 illustrates an example of tangents related to a geometric shape, according to some embodiments.

FIG. 4 illustrates an example 400 of tangents related to a geometric shape, according to some embodiments. More specifically, example 400 illustrates points and tangents on a circle. It is noted that the tangent of a given point on a line or a curve is the instantaneous rate of change at the given point. The tangent can be given in degrees (0°-180°) or in radians (0-PI or 3.14). Example 400 illustrates various locations of points A through D on a circle. The lines in red show the tangent line at each given point.

Figure 5:
FIG. 5 illustrates an example table with tangent values, according some embodiments.

FIG. 5 illustrates an example table 500 with tangent values, according some embodiments. For the points of the circle in example 500, table 500 shows the value of each tangent. Table 500 provides the tangent values in both degrees and radians.

It is noted that the change in tangent can be calculated as the difference between the current tangent and the tangent at the previous point. For example, the change in tangent in radians between Point A and Point B of Example 500 can be calculated by taking a difference of the tangents per the following equation:

TangentB−TangentA=0.79−0=0.79

Similarly, the tangent between Point C and Point B can be calculated per the following equation:

TangentC−TangentB=1.57−0.79=0.78

Figure 6:
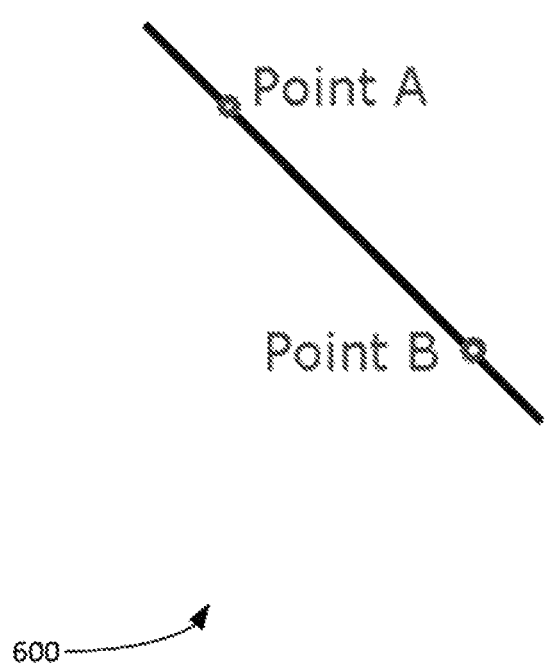
FIG. 6 illustrates an example of a straight line with a slope of forty-five degrees (45°) with the Points A and B which lie on the line, according to some embodiments.

The differences between change in tangents for lines and curves is now discussed. As noted supra, the change in tangent is relatively simple to calculate, given the tangent. The change in tangent of any straight line will always have a value of zero (0) as the instantaneous slope of any point on a straight line is always the same. For example, FIG. 6 illustrates an example 600 of a straight line with a slope of forty-five degrees (45°) with the Points A and B which lie on the line. The slope at both points would be forty-five degrees (45°) as the change in tangents between the two points is zero (0).

Returning to table 500 of FIG. 5, calculating the change in slope for all the points yields that the change in tangent for between every point was close to 0.79. This is an important property about circles: the change in tangent is always the same for any two points on a circle which are the same distance away. For example, Points A and B are equidistant as Points B and C and all enumerated points lie on the circle.

Figure 7:
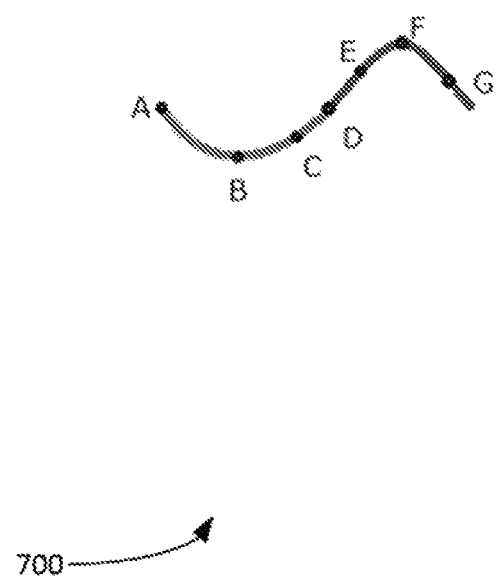
FIG. 7 illustrates tangent points on an object with two concavities, according to some embodiments.

FIG. 7 illustrates tangent points on an object 700 with two concavities, according to some embodiments. A change in tangent values can also be used to detect a change in concavity. The tangent points of the portion of object 700 marked in red have a different concavity than the tangent points of object 700 marked in blue.

Figure 8:
FIG. 8 illustrates an example table, according to some embodiments.

FIG. 8 illustrates an example table 800, according to some embodiments. Table 800 provides the value far the tangent and change in tangent at each point of object 700. Calculating the change in tangent on the red curve of object 700 (e.g. starting with the left point first) results in a positive change in the tangent value at each point as the tangent is always increasing. Calculating the change in the tangent value for each point on the blue curve portion of object 700 results in a negative change in tangent value as the tangent is always decreasing. The change in tangent value at the point between the red and blue curves (Point D of object 700) has a change in tangent of zero (0). Accordingly, Point D reflects an inflection point. It is noted that all the values for the change in tangent in table 800 before Point D are positive and values after Point D are negative.

Using these properties of the change in tangent, we can identify the following key properties for lines, circles and curves:

straight lines always have a change in tangent of zero (0);
circles always have a constant change in tangent; and
the change in concavity of any curve can be determined by finding an inflection point.

Various properties of a line are now discussed. While the change in tangent values can be used to identify a portion of an outline (e.g. a straight line etc.), other properties of a line which can also be used for classification of an object. Example properties of a line that can be calculated and used include, inter alia: the slope of the line; the absolute length of the line; the relative length of the line (e.g. the length of the line relative to the length of the outline, etc.).

The slope of a line can be calculated as the change in tangent at any point in the line. The absolute length of the line represents the number of pixels which are in the given line. The relative length of the line is its length relative to the rest of the outline it is a part of. The relative length of a line can be calculated per the following equation:

Relative Length of a Line=(Absolute length of line)/(Absolute length of the entire outline)

It is noted that, in some embodiments, relative length can be defining the relative length of sub-objects as a range instead of a static value.

Various properties of a curve are now discussed. A circular curve can be modelled a special curve where the change in tangent remains constant. A circle is a circular curve which does not have a beginning or an end, while some other curves have a beginning point and an endpoint.

A curve has additional other properties which can be used for classification operations. For example, the sum of changes to tangent values can be used for classification operations. In one example, the value of the sum of change of tangent values can be used to determine how many angles are included in the curve.

Figure 9:
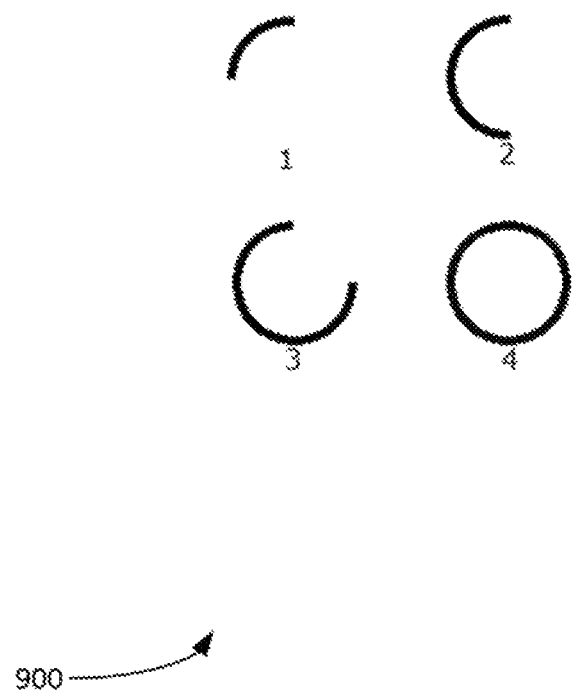
FIG. 9 illustrates a set of example circular curves, according to some embodiments.

FIG. 9 illustrates a set of example circular curves 900, according to some embodiments. The first curve of set of example circular curves 900 consists of a ninety degrees (90°) portion of a circle. The second curve consists of a one hundred and eighty degrees (180°) portion of a circle. The third curve consists of a two hundred and seventy degrees (270°) portion of a circle. The fourth object, a circle, consists of three hundred and sixty degrees (360°). Calculating a sum of all the changes in tangents points for each curve provides values substantially similar to these values.

In some embodiments, various types of curves (such as, inter alia: elliptical curves, circular curves, circles, etc.) can be defined by a combination of various geometric properties. Example geometric properties can include, inter alia:

Is Connected (e.g. whether the curve is connected and does not have end points, such as circle or ellipse);
Direction of change in tangent (e.g. positive if tangent is constantly increasing);

Number of angles covered (e.g. as measured in degrees or radians);

Absolute length; and

Relative length.

Representing an object as lines as curves

The outline of every object can be represented as a series of lines or curves. For example, a rectangle can be represented as an object with 4 straight lines, while a hexagon can be represented as an object with 6 straight lines. The lines and curves which represent an object will be referred to as sub-objects from here on. The properties of curves and lines can be used to classify each sub-object. Along with a list of each sub-object, it is important to note the relative angle between the two sub-objects as it could be used for classification of the object.

Figure 10:
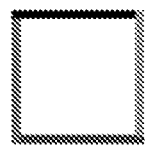
FIG. 10 illustrates an example set of geometric objects, according to some embodiments.
Figure 10:
Figure 10:

Methods to represent and/or identify corners are now discussed. FIG. 10 illustrates an example set of geometric objects 1000, according to some embodiments. Geometric objects 1000 can be square object and the parallelogram object. both have four (4) straight lines and four (4) corners. For the square object, all four (4) corners have an angle of ninety degrees (90°) while the corners for the parallelogram have different angles. Every corner of geometric objects 1000 have the following properties:

Angle of the corner;

First sub-object; and

Second sub-object.

The angle between two (sub)objects can be determined by taking the difference of the tangents of each object at the corner. For example, the red line in the square in FIG. 10 has a tangent of ninety degrees (90°) while the blue line has a tangent of zero degrees (0°). The difference between the two objects would give us the angle between the two sub-objects as ninety degrees (90°).

Figure 11:
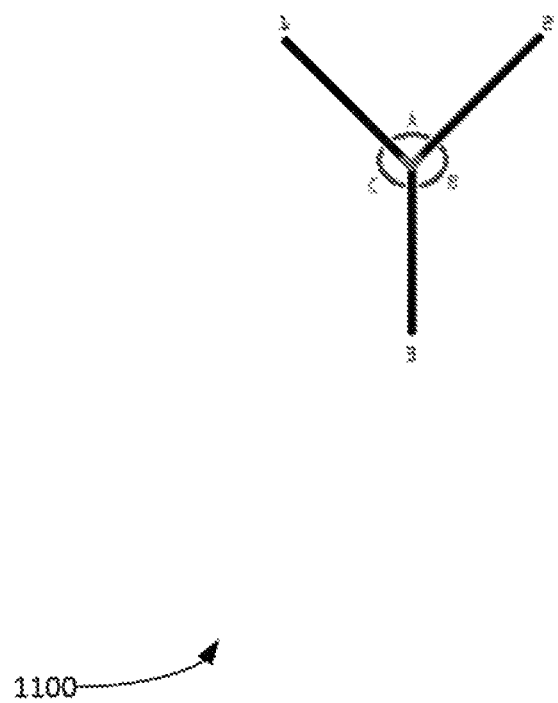
FIG. 11 illustrates an example intersection, according to some embodiments.
Figure 12:
FIG. 12 illustrates an example table with intersection attributes, according to some embodiments.

Various intersections are now discussed. It is noted that an intersection represents a point where more than two (2) objects are connected. FIG. 11 illustrates an example intersection 1100 (shown in red), according to some embodiments. Intersection 1100 can include three (3) corners: A, B, and C. Each of corner in the series has the following properties: angle, first sub-object and second sub-object. These properties are provided in FIG. 12. FIG. 12 illustrates an example table with intersection attributes, according to some embodiments. Sub-objects one (1), two (2), and three (3) are shown in black in FIG. 11. The intersection is shown in red. The three (3) corners which make up the intersection are shown in blue.

Figure 13:
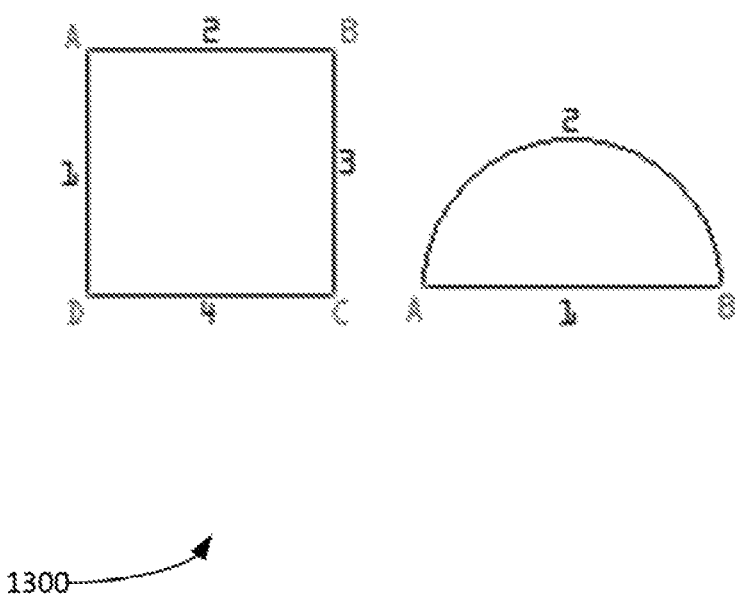
FIG. 13 illustrates two (2) geometric objects, according to some embodiments.
Figure 14:
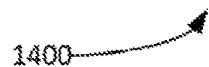
FIGS. 14-17 illustrates tables that represent sub-objects and the intersections for each geometric object of FIG. 13, according to some embodiments.
Figure 15:
Figure 16:
Figure 17:
Figure 18:
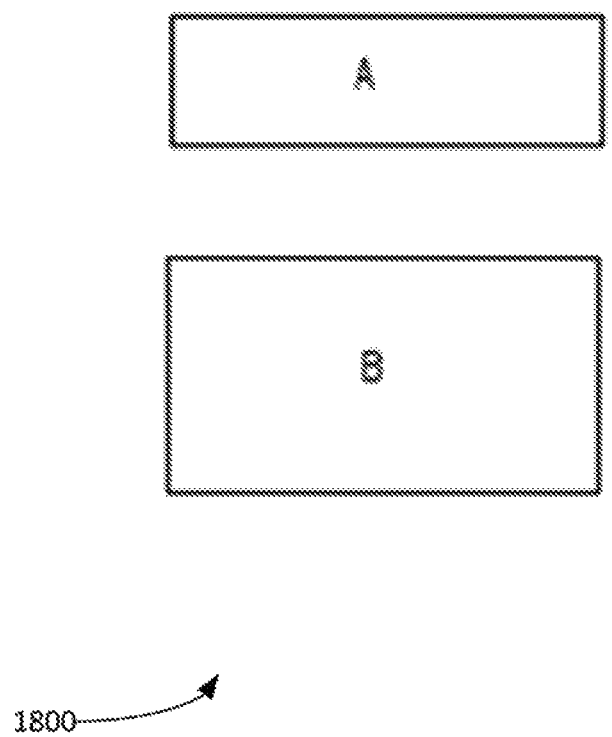
FIG. 18 illustrates an example of two rectangles, according to some embodiments.

An outline can be defined as sub-objects and intersections. The outline of geometric object can be divided into a series of sub-objects (e.g. lines or curves). The relationships between connected sub-objects can be defined as intersections and corners. Objects can then be defined and classified based on the sub-objects and intersections which define its outline. For example, FIG. 13 illustrates two (2) geometric objects 1300, according to some embodiments. Geometric objects 1300 can be a square and a semi-circle. FIGS. 14-17 illustrates tables 1400-1700 that represent sub-objects and the intersections for each geometric object of FIG. 13.

Various method of identifying objects based on sub-objects and intersections are now provided. The first step towards object recognition based on outlines would be to define objects as series of sub-objects and intersections similar to the definitions for squares and semi-circles given above. Once the definitions are in place, objects could be identified by comparing the sub-objects and intersections of the object being analyzed with the definitions of known objects. This method of object identification would be successful for objects of various sizes since it would rely on the relative length for comparisons. For example, a square where each side has the length of four (4) units would still result in four (4) sub-objects which are lines and four (4) corners. Each of the line sub-objects would have a relative length of one-fourth (¼), despite having an absolute length of four (4). The definition of the larger square would perfectly match the definition of the square given.

It is noted that there may be variances in relative length of sub-objects for the same object. For example, the two objects shown in FIG. 18 can both be considered as rectangles. However, the relative lengths of the sub-objects are noted to be different. Accordingly, a process can define the relative length of sub-objects as a range instead of a static value. Similarly, the values of an angle for a given corner can also be stored as a range instead of a static value to allow variance in angles at a given corner.

The outline of an object can be broken down into sub-objects which are either lines or curves. Each sub-object can have different properties based on whether it is a line or a curve. One property for the identification of a line is its relative length. The properties of a curve that can be used for its identification are: direction of change in tangent, number of angles covered, and relative length. Two adjacent curves with different concavities can be identified as different sub-objects due to the presence of an inflection point. Two connected sub-objects can be represented as a corner. One property of a corner is the angle between the two objects.

Relative lengths of sub-objects and the value of an angle for corners should be stored as ranges and not as static values; this accounts for variations within different instances of the same object. The method of object identification outlined in this paper would work independent of the size of an object due to the use of relative length during comparisons.

Since characters can be considered as object, the same method of object recognition can be used on any characters for the purposes of optical character recognition. This method can be used to define and identify characters for any language, making it an OCR method which would be independent of language.

Figure 19:
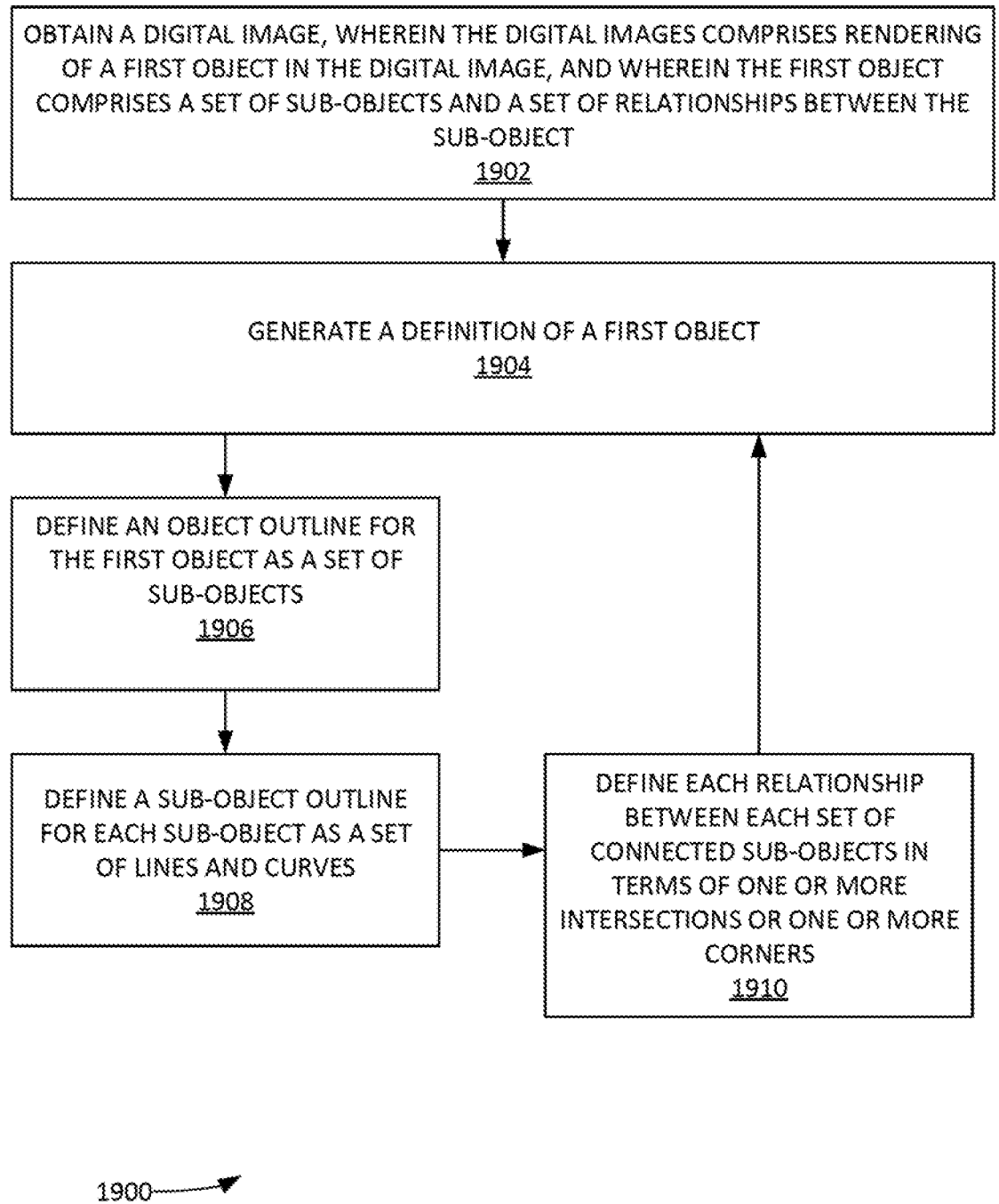
FIG. 19 illustrates an example process for digital-image shape recognition, according to some embodiments.

FIG. 19 illustrates an example process 1900 for digital-image shape recognition, according to some embodiments. In step 1902, process 1900 can obtain a digital image. The digital images include a rendering of a first object in the digital image. The first object includes a set of sub-objects and a set of relationships between the sub-object. In step 1904, process 1900 generates a definition of a first object. Step 1904 can be implemented by steps 1906 and 1910. In step 1906, process 1900 can define an object outline for the first object as a set of sub-objects. In step 1908, process 1900 can define a sub-object outline for each sub-object as a set of lines and curves. In step 1910, process 1900 can define each relationship between each set of connected sub-objects in terms of one or more intersections or one or more corners.

Process 1900 can compare the definition of an object or character with a library of known definitions in order to recognize the character. Process 1900 can be used to recognize typed characters for any language (e.g. OCR). Process 1900 can be used to recognize handwritten characters for any language (ICR). Process 1900 can be used to recognize generic objects (e.g. squares, triangles, cars, bottles, etc.) based on their shapes/outlines. Process 1900 can use topological skeletonization when identifying characters. Topological skeletonization may not done when analyzing generic objects and is only done for characters.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed:

1. A method of optical character recognition of digital character objects in digital images comprising:
    obtaining a digital image, wherein the digital images comprises rendering of a first object in the digital image, and wherein the first object comprises a set of sub-objects and a set of relationships between the sub-object;
    generating a definition of a first object by:
        defining an object outline for the first object as a set of sub-objects;
        defining a sub-object outline for each sub-object as a set of lines and curves, and
        defining each relationship between each set of connected sub-objects in terms of one or more intersections or one or more corners;
    obtaining a second digital image; and
    for the second object in the other digital image, matching the attributes of the second object with the definition of the first object within a specified threshold.

2. The method of claim 1 further comprising:
    based on the match of object outline, implementing as an optical character recognition operation that determines the second object is an equivalent character to the first object.

3. The method of claim 1, wherein the digital image comprises: a scanned document in a digital format, a digital photo of a document, or a digital scene-photo.

4. The method of claim 1, wherein the first object comprises an alpha-numeric character.

5. The method of claim 1, wherein a line is defined in terms of a slope of the line; an absolute length of the line; a relative length of the line.

6. The method of claim 5, wherein the relative length of the line is defined as:

Relative Length of a Line=(Absolute length of line)/(Absolute length of the entire outline).

7. The method of claim 5, wherein a curve is defined in terms of specified geometric properties that comprise: whether the curve endpoints are connected, a direction of change in tangent in the curve a number of angles covered in the curve, an absolute length of the curve, a relative length of the curve.

8. The method of claim 6,
    wherein an intersection is defined in terms of a number of corners of the intersection, and
    wherein the digital character object comprises a typed character of any language, a handwritten character of any language, or a generic object based on their shapes/outlines.

9. The method of claim 7,
    wherein a corner is defined in terms of an angle value of the corner, and
    wherein the definition of a first object is stored in a library of known definitions in order to recognize characters or shapes.

10. A computerized system useful for optical character recognition of character objects in digital images comprising:
    at least one processor configured to execute instructions;
    a memory containing instructions when executed on the processor, causes the at least one processor to perform operations that:
        obtain a digital image, wherein the digital images comprises rendering of a first object in the digital image, and wherein the first object comprises a set of sub-objects and a set of relationships between the sub-object;
        generate a definition of a first object by:
            define an object outline for the first object as a set of sub-objects;
            define a sub-object outline for each sub-object as a set of lines and curves; and
            define each relationship between each set of connected sub-objects in terms of one or more intersections or one or more corners;
        obtain a second digital image; and
        for the second object in the other digital image, match the attributes of the second object with the definition of the first object within a specified threshold.

11. The method of claim 10, wherein the memory containing instructions when executed on the processor, causes the at least one processor to perform operations that:
    based on the match of object outline, implement an optical character recognition operation that determines the second object is an equivalent character to the first object.

12. The computerized system of claim 11, wherein the digital image comprises: a scanned document in a digital format, a digital photo of a document, or a digital scene-photo.

13. The computerized system of claim 12, wherein the first object comprises an alpha-numeric character.

14. The computerized system of claim 13, wherein a line is defined in terms of a slope of the line; an absolute length of the line; a relative length of the line.

15. The computerized system of claim 14, wherein the relative length of the line is defined as:

Relative Length of a Line=(Absolute length of line)/(Absolute length of the entire outline).

16. The computerized system of claim 15, wherein a curve is defined in terms of specified geometric properties that comprise: whether the curve endpoints are connected, a direction of change in tangent in the curve, a number of angles covered in the curve, an absolute length of the curve, a relative length of the curve.

17. The computerized system of claim 16, wherein an intersection is defined in terms of a number of corners of the intersection.

18. The computerized system of claim 17, wherein a corner is defined in terms of an angle value of the corner.

* * * * *